United States Patent [19]
Williams

[11] 4,285,473
[45] Aug. 25, 1981

[54] COMPACT SPEED-REDUCING UNIVERSAL MOTOR DRIVE ASSEMBLY ARRANGEMENT FOR FOOD PROCESSOR

[75] Inventor: James E. Williams, Stamford, Conn.

[73] Assignee: Wilson Research & Development, Inc., Greenwich, Conn.

[21] Appl. No.: 47,312

[22] Filed: Jun. 11, 1979

Related U.S. Application Data

[63] Continuation-in-part of Ser. No. 847,759, Nov. 2, 1977, abandoned.

[51] Int. Cl.³ ............................................. B02C 18/12
[52] U.S. Cl. .................... 241/37.5; 74/417; 74/421 A; 188/166; 241/282.1; 366/314
[58] Field of Search .................. 241/36, 37.5, 199.12, 241/282.1, 282.2; 30/423; 74/417, 421 A; 188/166; 366/314

[56] References Cited

U.S. PATENT DOCUMENTS

| | | |
|---|---|---|
| 978,372 | 12/1910 | Hayne et al. . |
| 1,226,454 | 5/1917 | Braden . |
| 1,317,298 | 9/1919 | Hoyt . |
| 1,450,660 | 4/1923 | Alberger . |
| 1,675,694 | 7/1928 | Claybourn . |
| 2,005,374 | 6/1935 | Johnston et al. . |
| 2,209,477 | 7/1940 | Reibel .................... 74/421 A UX |
| 2,805,697 | 9/1957 | Nieland . |
| 2,915,912 | 12/1959 | Hussar .................... 74/417 X |
| 3,220,450 | 11/1965 | Aronson et al. .................. 241/199.12 |
| 3,493,022 | 2/1970 | Mantelet .................... 241/199.12 |
| 3,528,469 | 9/1970 | Mantelet . |
| 3,809,325 | 5/1974 | Marrie .................... 241/282.1 X |
| 3,892,365 | 7/1975 | Verdun .................... 241/282.1 X |
| 3,989,198 | 11/1976 | Blasko .................... 241/36 X |

Primary Examiner—Howard N. Goldberg
Attorney, Agent, or Firm—Parmelee, Johnson, Bollinger & Bramblett

[57] ABSTRACT

An improved drive unit for a food processor of the type wherein the drive unit is enclosed in a base housing and has a vertically extending spindle which extends into a processing bowl and carries rotary tools thereon. The drive unit comprises a horizontally mounted universal motor carrying a pinion gear at the end of its shaft. A ring gear meshes with the pinion and encircles the motor on a concavo-convex support structure. The support structure is coupled to the vertical spindle. Included in the drive unit are a novel three point shock mounting for the motor and an automatic brake to prevent coasting of the tool after the motor is deenergized. In a further embodiment of the drive unit the motor and the concavo-convex ring gear are held in a motor mount which is vibrationally isolated from the base housing for providing quieter operation. This mount arches up over the dome of the ring gear which in turn arches up over the motor. A lockable adjustment is provided in the motor mount for adjusting the engagement between the pinion gear and ring gear, and another form of automatic brake is shown.

42 Claims, 18 Drawing Figures

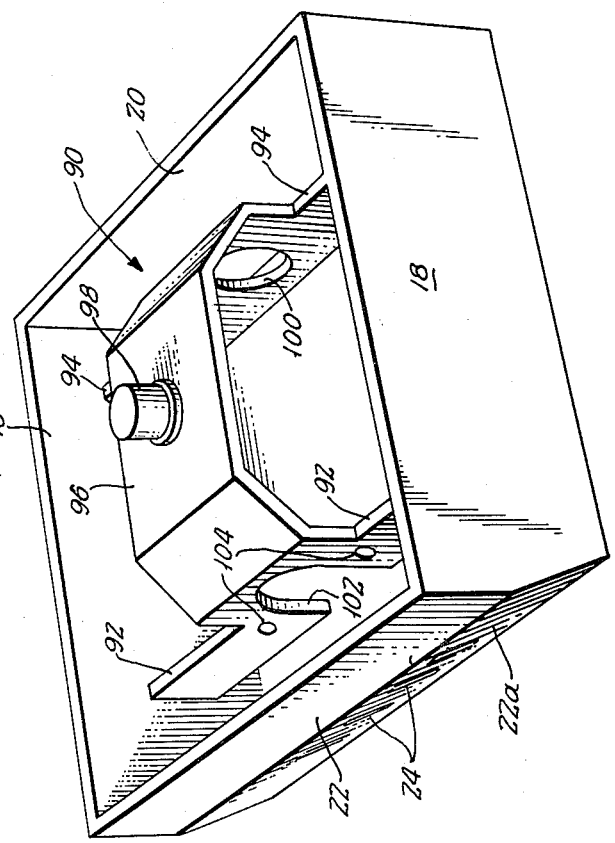
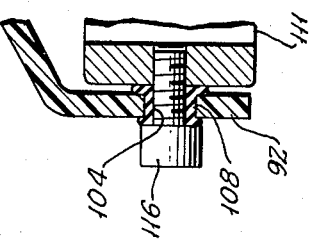
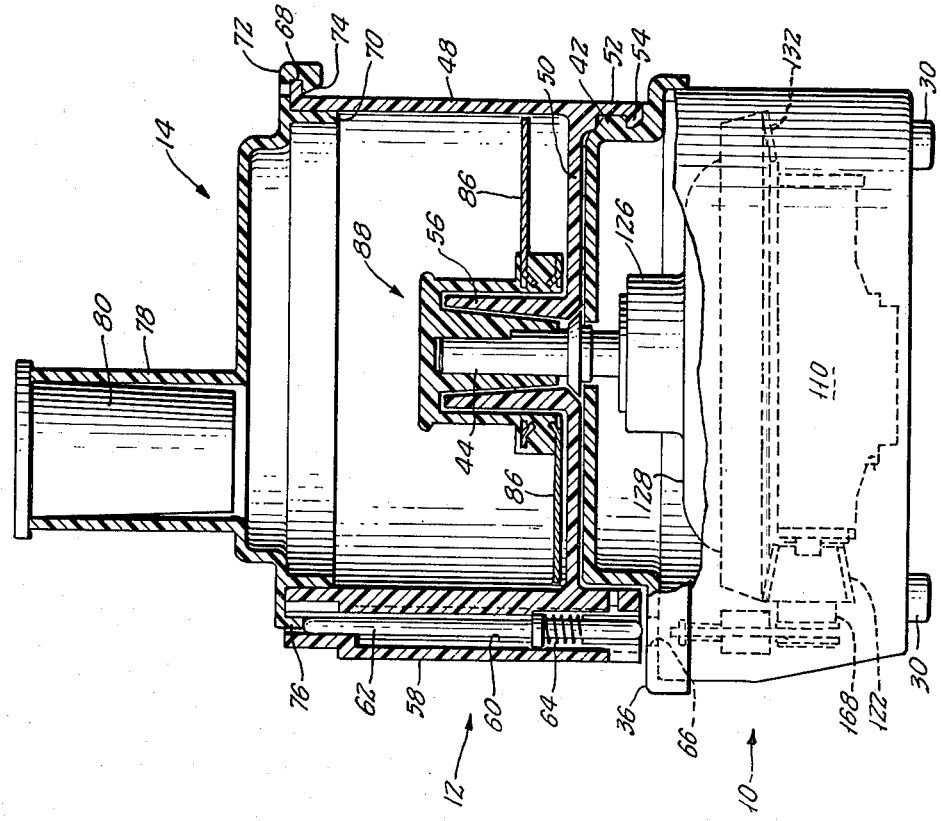
FIG. 4.
FIG. 3.
FIG. 1.

FIG. 5. FIG. 6.
FIG. 7.
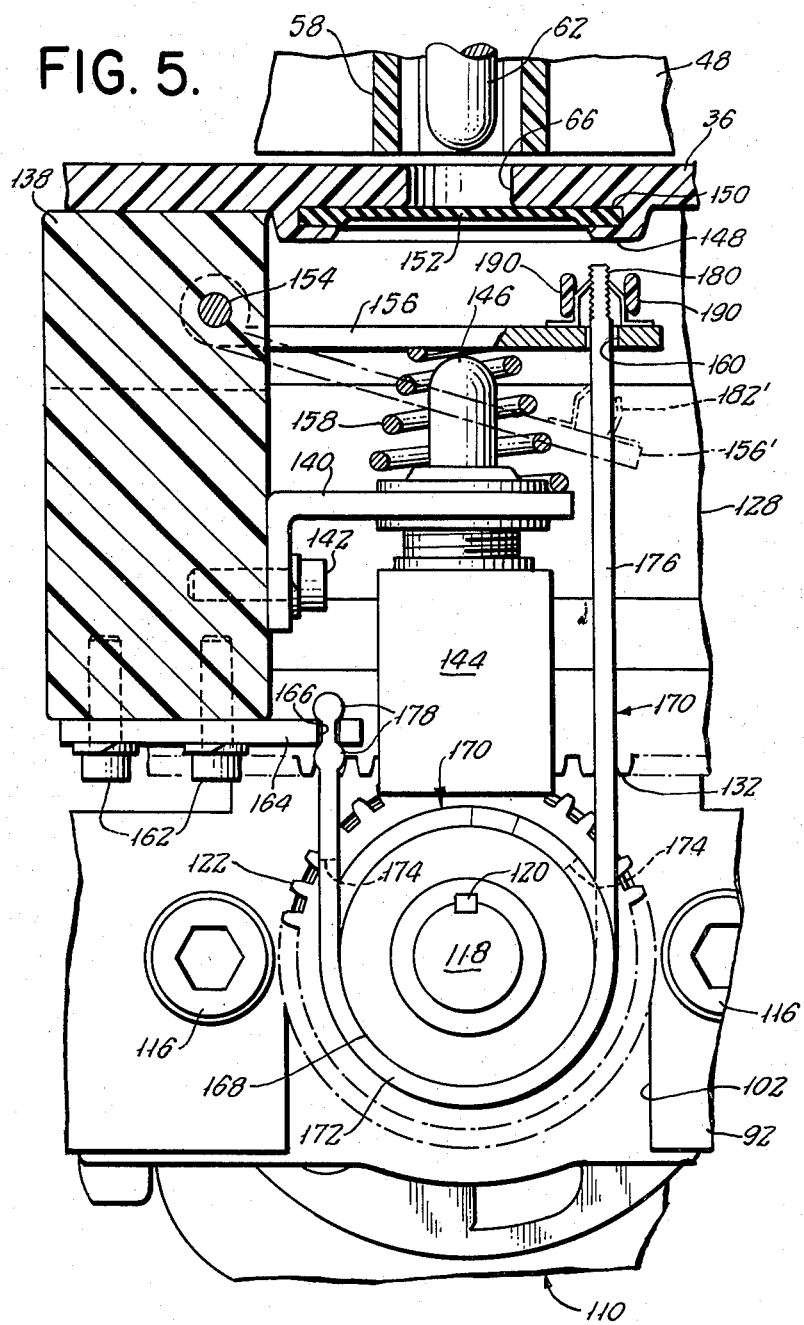
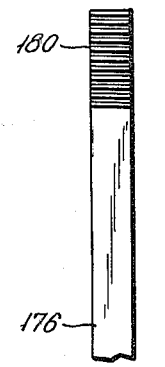
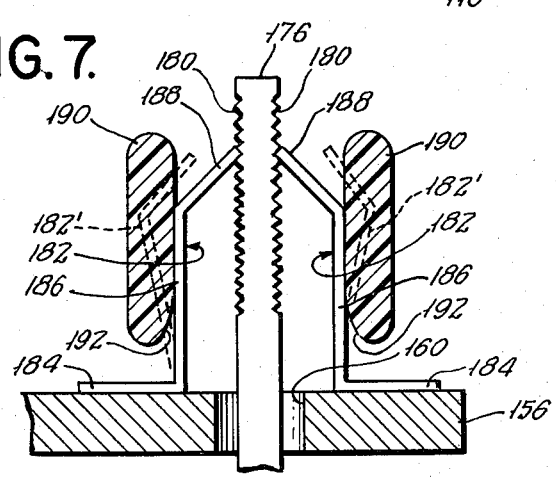

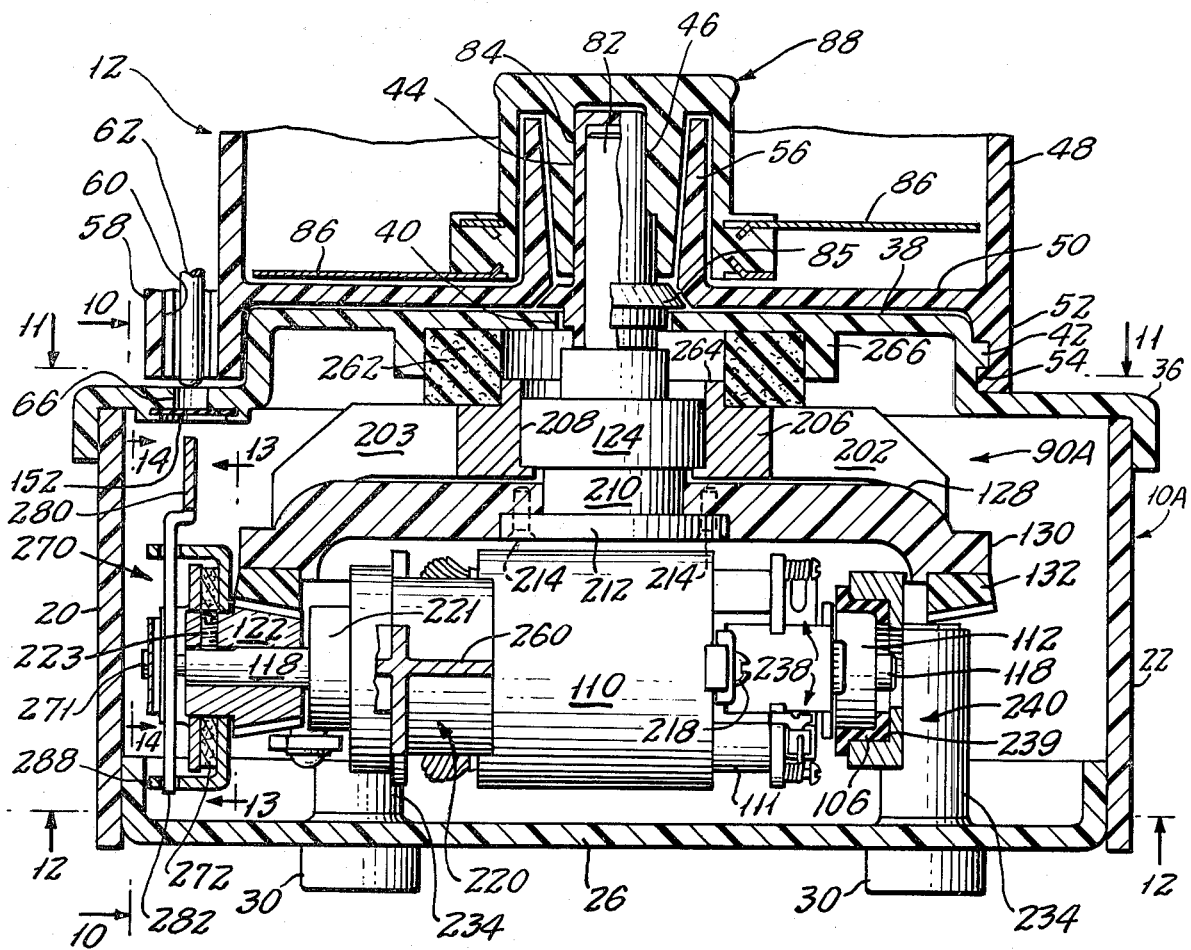

COMPACT SPEED-REDUCING UNIVERSAL MOTOR DRIVE ASSEMBLY ARRANGEMENT FOR FOOD PROCESSOR

RELATED APPLICATIONS

This application is a continuation-in-part of copending application Ser. No. 847,759, filed on Nov. 2, 1977, and now abandoned.

BACKGROUND OF THE INVENTION

This invention pertains to multipurpose food processors of the type including a base housing having a drive unit therein with a rotary tool spindle protruding vertically therefrom. A bowl is mounted on the base housing and has a bottom opening through which the spindle extends. Various tools may be mounted on the spindle for rotation within the bowl for processing different types of foods. A cover mounted on the bowl has an opening through which food may be introduced to be sliced, chopped, grated, mixed, pureed or otherwise prepared. Examples of food processors of this type will be found in U.S. Pat. Nos. 3,892,365 of Verdun and 3,985,304 of Sontheimer.

Most prior art food processors of the type referred to employ a squirrel cage induction motor as the main drive. The advantage of such a motor is that its speed is compatible with the operations to be performed and, accordingly, it requires no speed reduction. However, it is heavy and expensive. Also, its load characteristics are not particularly good as motor slip and tendency to overheat become relatively pronounced at higher loads. Furthermore, its vertical mounting means that the base housing must be relatively tall and this is a disadvantage when used and stored in the average home kitchen. It would be preferable to employ a universal motor in a device of this type as such motors are lightweight and inexpensive and have the added advantage of being operable on both AC and DC current. However, the speeds of these motors are quite high, on the order of 10,000-20,000 rpm. or more. This necessitates some type of gearing or belting. In prior art food processors employing universal motors, the universal motors have been mounted on a vertical axis and connected by belt to the vertical tool spindle. This has resulted in rather bulky base housings in order to provide room for pulleys, belts, etc.

Most prior art food processors are designed in such a manner that the cover must be securely clamped to the bowl before the drive unit will start. Removal of the cover automatically deenergizes the drive. This is a safety feature to prevent injury to the user by the often sharp, spinning tools. However, the blades will continue coasting for a time after the motor is deenergized, and this could result in injuries if the user suddenly removed the cover and immediately reached into the bowl.

Finally, it is also important to keep the vibration and noise of a home kitchen appliance to an absolute minimum. The motor mounting of many of the prior art processors leaves much to be desired in this regard.

Accordingly, it is a primary object of the present invention to provide an improved food processor wherein the drive unit employs a universal motor with a unique gearing arrangement resulting in an extremely compact and efficient power package.

Another object is to provide such a processor wherein the motor is mounted in a nearly vibration-free, yet simple and efficient manner.

Another object is to provide such a processor wherein the spinning tools are braked to a stop upon removal of the bowl cover.

Other objects, features, and advantages will become apparent from the following description and appended claims.

SUMMARY OF THE INVENTION

An improvement is provided in a food processor of the type including a base housing enclosing a drive unit with a rotatable spindle driven by the drive unit extending vertically upward from the houding, a bowl detachably mounted on the housing and defining a base opening for receiving the spindle, adapted to have a rotary tool mounted on the spindle within the bowl, and with a cover detachably secured to the bowl defining a passageway for feeding food into the bowl. The improvement comprises means for supporting an electric motor within the housing and a universal electric motor carried by the supporting means with its drive shaft horizontal. A pinion gear is mounted on the drive shaft and a ring gear engages the pinion and encircles the motor for rotation thereabout in a substantially horizontal plane. Means are provided for coupling the rotation of the ring gear to the vertically extending, rotatable spindle and for controlling rotation of the motor and for automatically braking rotation of the motor when the cover is removed from the bowl.

BRIEF DESCRIPTION OF THE DRAWINGS

FIG. 1 is an elevational view of a food processor in accordance with this invention, in partial cross section to illustrate its internal construction;

FIG. 3 is a perspective view of a portion of the base housing, showing the motor mount therein;

FIG. 4 is an enlarged cross sectional detail of one of the attachments to the motor mount;

FIG. 5 is an enlarged cross section taken substantially along the line 5—5 of FIG. 2, illustrating the brake assembly;

FIG. 6 is an enlarged laid out view of the brake band used in the brake assembly;

FIG. 7 is an enlarged detail of the brake and clamping assembly;

FIG. 9 is an elevational sectional view of the base housing and drive unit of a food processor including a further embodiment of the present invention. This Figure shows the lower portion of the working bowl and is drawn on a somewhat smaller scale than FIG. 2;

FIG. 10 is a sectional view taken along the line 10—10 in FIG. 9 looking to the right, with the brake assembly removed for revealing the drive unit and motor mount more clearly;

FIG. 12 is taken along the line 12—12 in FIG. 9, looking up, with the brake assembly and housing removed;

FIG. 12 is taken along the line 14—14 in FIG. 9 looking toward the right;

DESCRIPTION OF THE PREFERRED EMBODIMENT

Figure 2:
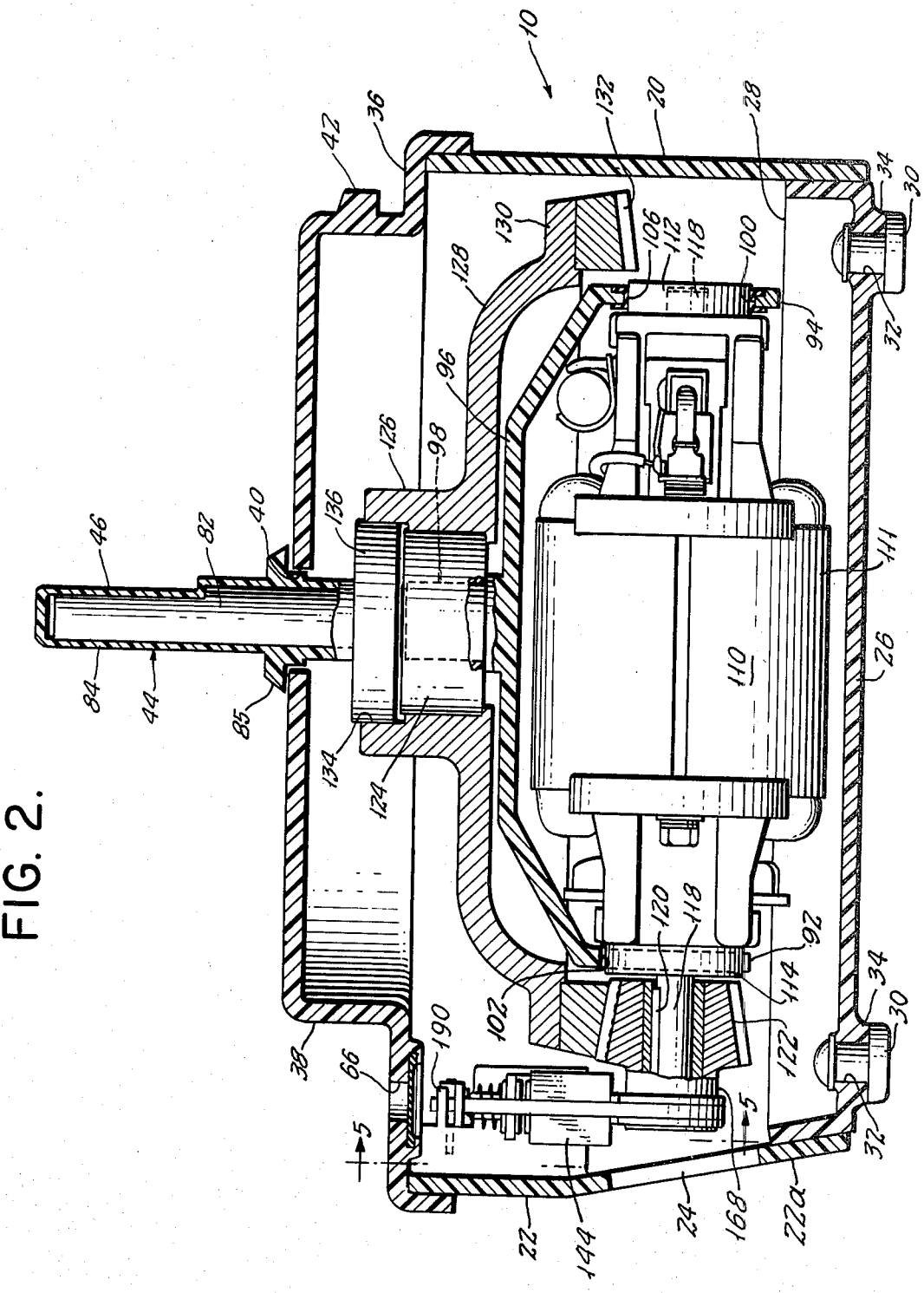
FIG. 2 is an enlarged cross sectional view of the base housing and drive unit portion of the invention.

With particular reference to the drawings, there is illustrated in FIG. 1 a food processor embodying this invention and comprising a base housing 10, a working bowl 12 removably mounted thereon for holding food material to be processed, and a removable cover 14 on the bowl. The base housing 10 comprises three basic structural elements. The first of these is a box-like enclosure, best illustrated in FIG. 3 and including spaced, parallel sidewalls 16, 18, rear wall 20, and front wall 22, the latter including an angled portion 22a having a plurality of ventilation slots 24 therethrough. The second element of base housing 10 is a substantially rectangular base plate 26 (FIG. 2) having a vertical flange 28 positioned inside of the vertical walls and having on its bottom surface four rubber-like feet 30 conventionally mounted through holes 32 formed in bosses 34. The third element making up base housing 10 is a top closure 36 which is essentially rectangular to conform to the shape of the housing, but includes an upwardly, extending circular turret 38 which defines a central, circular opening 40 and has molded into its outer periphery at least two spaced locking lugs 42. Extending upwardly through the opening 40 in top closure 36 is a spindle 44 having a flat 46 along one side and driven by a drive unit within the base housing 10 to be described more fully infra.

The bowl 12 has a cylindrical sidewall 48 and a raised bottom 50, thereby forming a depending skirt 52. Extending inwardly from the skirt 52 are a plurality of projections 54 positioned to lock under the lugs 42 on the base housing when the bowl is rotated thereon. The bowl base 50 defines a central opening bounded by a cylindrical socket 56 which surrounds the spindle 44. On the outer surface of the cylindrical sidewall 48 is a vertical boss 58 defining a bore 60 having therein a sliding rod 62 spring loaded upwardly by means of spring 64. When bowl 12 is locked into position on base housing 10, the end of rod 62 is aligned with an opening 66 in the top closure 36 of base housing 10. The upper rim of the cylindrical sidewall 48 carries a plurality of spaced, radially outwardly extending locking tabs 68.

The cover 14 for the bowl is substantially circular with a depending inner flange 70 which fits within the cylindrical sidewall 48 and an outer flange 72 which carries a plurality of depending locking fingers 74 positioned such that, when the cover 14 is rotated, they engage respective locking tabs 68. Also depending from the outer flange 72 is a camming member 76 positioned to engage and depress the sliding rod 62 when cover 14 is rotated to its fully closed and locked position. A vertical hopper or well 78 extends through the cover 14 for the insertion of food which may be pressed inwardly by means of a movable pusher 80.

As will be seen from FIG. 2, the spindle 44 comprises a steel core 82 with an outer plastic sleeve 84 having a sealing flange 85 covering opening 40. Various tools may be positioned over this spindle, as shown in FIG. 1, each comprising one or more blades 86 mounted on a hub 88. Further details of the construction of bowl 12, cover 14, and the tool assemblies will be found in the above-referenced U.S. Pat. No. 3,892,365 of Verdun.

The drive unit of this invention is mounted in the base housing 10 by means of motor mount 90 shown in FIG. 3. It comprises front 92 and rear 94 cross members, each of which extends between, and is secured at its ends to, the sidewalls 16, 18. The cross members 92, 94 are interconnected by means of an upwardly bowed bridging member 96 which has an integral stub shaft 98 extending upwardly therefrom for alignment with the opening 40 in the top closure 36 when it is mounted on the base housing 10. The rear cross member 94 defines a central, circular opening 100. Aligned therewith, and defined by the front cross member 92, is an opening 102 in the form of an inverted U extending through the bottom edge of cross member 92. On either side of the opening 102 is a bolt hole 104. The opening 100 in the rear cross member is provided with a rubber grommet 106 (FIG. 2) and the bolt holes 104 in the front cross member 92 are provided with similar but smaller grommets 108 (FIG. 4).

A universal motor 110 is carried by the motor mount 90 at three support points. This universal motor 110 is positioned within the base housing 10 with its axis of rotation as defined by a rotatable motor shaft 118 extending horizontally parallel with the base plate 26. The frame 111 of this motor includes a circular boss 112 encircling and concentric with the motor shaft 118 at one end of the motor, this boss 112 being inserted through and held snuggly by the resilient grommet 106. A similar boss 114 at the other end of the motor fits within, but is spaced from, the opening 102 where it is retained by means of bolts 116 which extend through the grommeted holes 104, as shown in FIG. 4. The resilient grommets 108 are symmetrically located on opposite sides of the axis of motor shaft 118, and the other grommet 106 is concentric with the axis. In this manner, a rigid but vibration-absorbing three-point mounting is provided by the grommeted opening 100 and bolt holes 104. Extending horizontally toward the front of the base housing is the motor shaft 118 upon which is mounted by means of a key 120, a bevelled pinion gear 122.

Mounted atop the stub shaft 98 of the motor mount 90 is a bearing assembly 124 comprising an inner race mounted on shaft 98 and an outer race secured to the central hub 126 of a rotatable saucer-shaped, concavo-convex gear support member 128. Member 128 has a horizontal annular rim 130 from which depends a bevelled ring gear 132 whose teeth mesh with the pinion gear 122 and encircle the motor 110. The ring gear 132 may be secured to member 128, as shown, by any suitable means. Alternatively, it may be integral therewith. The upper surface of the hub 126 has a circular recess 134 within which is fixedly secured a steel disk 136 which forms the head of the core 82 of spindle 44. Thus, it is seen that the bearing assembly 124 rotatably supports the spindle 44 with the spindle axis of rotation extending vertically and also rotatably supports the ring gear 132 for revolving in a horizontal plane. This ring gear 132 encircles the entire motor frame 111 in a compact configuration. The upwardly arched bridging member 96 and the inverted saucer-shaped ring gear support member 128 both are nested down around the motor 110 in overlapping relationship with one of them nested within the other. Their nested relationship contributes to the compact configuration of the drive unit and advantageously reduces the required headroom within the base housing 10. The gear support member 128 and its hub 126 serve for coupling the rotating ring gear 132 to the spindle 44 for rotating the spindle about its axis.

Formed on the inner surface of front wall 22 of base housing 10 is a boss 138 (FIG. 5) which supports the motor switch and the brake assembly which will now be described with particular reference to FIGS. 5-7. Mounted against the boss 138 by means of an L-shaped bracket 140 and screws 142 is a conventional electric motor switch 144 having a vertically extending actuator button 146 which is aligned with the opening 66 in top closure 36. Formed on the inner surface of top closure 36 and surrounding the opening 66 is a lip 148 defining a recess 150 within which is retained a flexible diaphragm 152. Diaphragm 152 seals the opening 66 so as to prevent the entry of food, liquid, or other deleterious substances into the base housing 10. Mounted to the boss 138 by means of a pivot pin 154 is a brake lever 156 which overlies switch button 146 and is urged into its upward position by means of a coil spring 158 seated on bracket 140. Near its distal end, the brake lever 156 defines an opening 160 therethrough.

Secured to the bottom of boss 138 by means of screws 162 is a brake band support arm 164 which has a slot 166 therethrough. The slot 166 is aligned substantially vertically with one edge of a brake drum 168 secured to the outer end of shaft 118. A flexible brake band 170 is secured by one end to the support arm 164, encircles the brake drum 168, and its other end is releasably secured to brake lever 156. It is illustrated in detail in FIG. 6. It includes a relatively wide body portion 172 having a longitudinal slot 174, and an elongated narrow tongue 176 having a width slightly less than that of slot 174. It is formed of a suitable plastic material and has molded into its end in the wide body portion 172 a pair of spaced ridges 178 by means of which the end is retained in the slot 166 of support arm 164 as illustrated. The band is wrapped around the brake drum 168 one and a half times, the tongue 176 being inserted through the slot 174 and lying therein along the lower half circumference of the brake drum. Both sides of the end of tongue 176 are formed with serrations 180 thereon and this end extends upwardly through the opening 160 in brake lever 156.

By reference to FIG. 7, it will be seen that the brake lever 156 carries a pair of cooperating, resilient clamp members 182 positioned on either side of the opening 160. Each of clamp members 182 is substantially Z-shaped and includes a flat mounting base 184 secured to lever 156, an outwardly biased resilient center section 186, and an inwardly angled clamping end 188. The normal configuration of clamp members 182 would cause them to assume the dotted line positions indicated at 182'. However, extending outwardly from the inner side of the base housing 10 are a pair of clamping bars 190. These bars are substantially rectangular in cross section, but their lower inside edges are rounded to form camming surfaces 192. Thus, when the brake lever 156 is pivoted downwardly into position 156' illustrated in FIG. 5, the clamp members 182 are in their open positions, out of engagement with the brake band 170. When the lever 156 is raised by the action of spring 158, the clamping ends 188 of clamp members 182 engage the camming surface 192 and are forced inwardly, thereby causing the clamping ends 188 to engage the serrations 180 in the brake band 170 for pulling the brake band snug around the drum 168. This drum 168 is shown as being formed by an extended hub portion on the pinion gear 122. The action of the clamping ends 188 engaging the serrations 180 each time that the brake band is pulled serves to provide compensation for wear of the brake band.

ASSEMBLY AND OPERATION

FIG. 3 illustrates the central portion of base housing 10 with its integral motor mount 90. The rubber grommets 106, 108 are inserted in the openings 100, 104, and the motor 110 is inserted through the bottom, the boss 110 being positioned in the grommeted opening 100. The front end of the motor is then lifted into the opening 102 and screws 116 are engaged as shown in FIG. 4 by means of a suitable tool such as a screwdriver, socket wrench, or Allen wrench, which may be inserted through one of the ventilation slots 24 or through openings specially provided. The base plate 26 may thereafter be attached. The manner in which the remaining portions of the drive unit are assembled will be apparent to those skilled in the art from the foregoing description and drawings and need not be further explained.

It is important to note that the gear support member 128 overlies and surrounds the universal motor 110 in such a manner that a very compact assembly is achieved. However, it is equally important to note that a very favorable gear ratio is achieved which makes possible the use of a high speed universal motor. In one actual embodiment, the pinion and ring gears are spiral bevel gears, the pinion being of steel and having 22 teeth and the ring gear being of Delrin and having 130 teeth, thereby obtaining a speed reduction of nearly 6:1.

The operation of the brake will be most apparent from the following description taken in conjunction with the illustration of FIG. 5. As explained in the above referenced Verdun patent, the cover 14 is rotatably secured to the bowl 12 and, in the act of rotatably locking it into position, the camming member 76 depresses the sliding rod 62. Rod 62 is forced through the opening 66, stretching the diaphragm 152 and forcing down the button 146 of switch 144, thereby starting the motor. In the present invention, the brake lever 156 which is interposed between the rod 62 and the switch button 146 is also depressed into position 156'. The clamp members 182 spring apart when they move away from the confines of clamping bars 190, thereby releasing the upper end of the brake band 170. The brake band 170 thus loosens its grip around the brake drum 168, permitting the motor 110 to operate unimpeded. Upon completion of the food processing operation, the cover 14 is rotated in the opposite direction for removal. This releases the sliding rod 62 which is withdrawn into the boss 58 as shown in FIG. 5. Simultaneously, the spring 158 forces the brake lever 156 back into the illustrated solid-line position. As the clamp members 182 make contact with the camming surfaces 192 on the clamping bars 190, they are forced inwardly and engage the serrations 180 in the brake band 176. This contact is made before brake lever 156 completes its upward movement. Accordingly, as this movement is completed under the force of spring 158, the end of the brake band 170 is pulled upward and tightens securely around the brake drum 168. The 6:1 mechanical advantage of the gearing very rapidly brakes the drive unit and the rotating processing tool to a quick stop, even before the cover can be removed, thereby preventing injury to the user.

Figure 8:
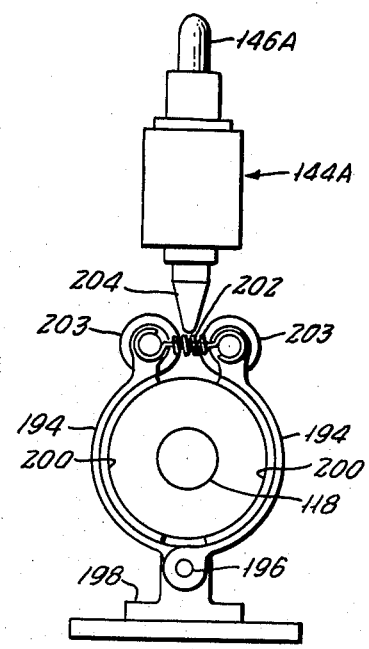
FIG. 8 illustrates an alternative brake assembly.

In the alternative brake assembly as shown in FIG. 8 there are a pair of opposed brake shoes 194 which are pivoted at 196 to a mounting bracket 198 which is attached to the motor mount 90 so that the pivot 196 is aligned with and below the motor shaft 118. A curved friction pad 200 lines each of the brake shoes. These pads engage the brake drum 168 whenever a brake applying spring 202 is allowed to pull the brake shoes toward the drum. The tension spring 202 is attached to the opposite ends 203 of the curved brake shoes 192 from the pivot 196. A modified motor switch 144A has a straight-through actuator plunger 146A with a wedge-shaped lower end 204.

Whenever the plunger 146A is depressed for closing the circuit for energizing the motor 110, the wedge portion 204 moves downwardly between the ends 203 of the brake shoes 194, thereby overcoming the spring force and moving the brake shoes apart. In this way the braking pressure of pads 200 is released. Conversely, whenever the cover 14 is removed from its working position on the bowl, the plunger 146A is allowed to be raised by an internal spring (not shown) within the switch 144A. The wedge portion 204 is withdrawn upwardly allowing the spring 202 to apply the braking pressure.

FURTHER EMBODIMENT OF THE INVENTION

In the further embodiment of this invention shown in FIGS. 9 through 18 the various elements performing functions corresponding to those in FIGS. 1 through 8 have the same reference numbers. The working bowl 12 and the turret 38 on which the bowl is mounted during operation may be identical to those components described above, and so their description will not be repeated. Also, the spindle 44 and the food processing tool mounted on it are shown the same as described above. It is noted that more than one flat surface 46 may be provided on the spindle 44, or it may have a spline configuration for providing a driving engagement with the hub 88 of the tool. It is also noted that the base housing 10A and motor mount 90A may be arranged so that the bowl 12 is mounted on the turret 38 with the vertical boss 58 and sliding push rod 62 positioned toward the front of the base housing or may be arranged so that the bowl is mounted with the boss 58 and sliding rod 62 positioned toward the rear of the base housing.

From a mechanical point of view either arrangement is equally acceptible, but it is my preference to employ the latter arrangement because I think a more attractive over-all appearance for the food processor is provided when the sliding push rod 62 is located toward the rear. Accordingly, in this description it is assumed that the right side of FIG. 9 is the front of the food processor. It is also to be understood that the components in the food processor shown in FIGS. 1-8 can be rearranged so that the working bowl could be mounted with the push rod 62 located at the rear of the base housing 10.

Figure 11:
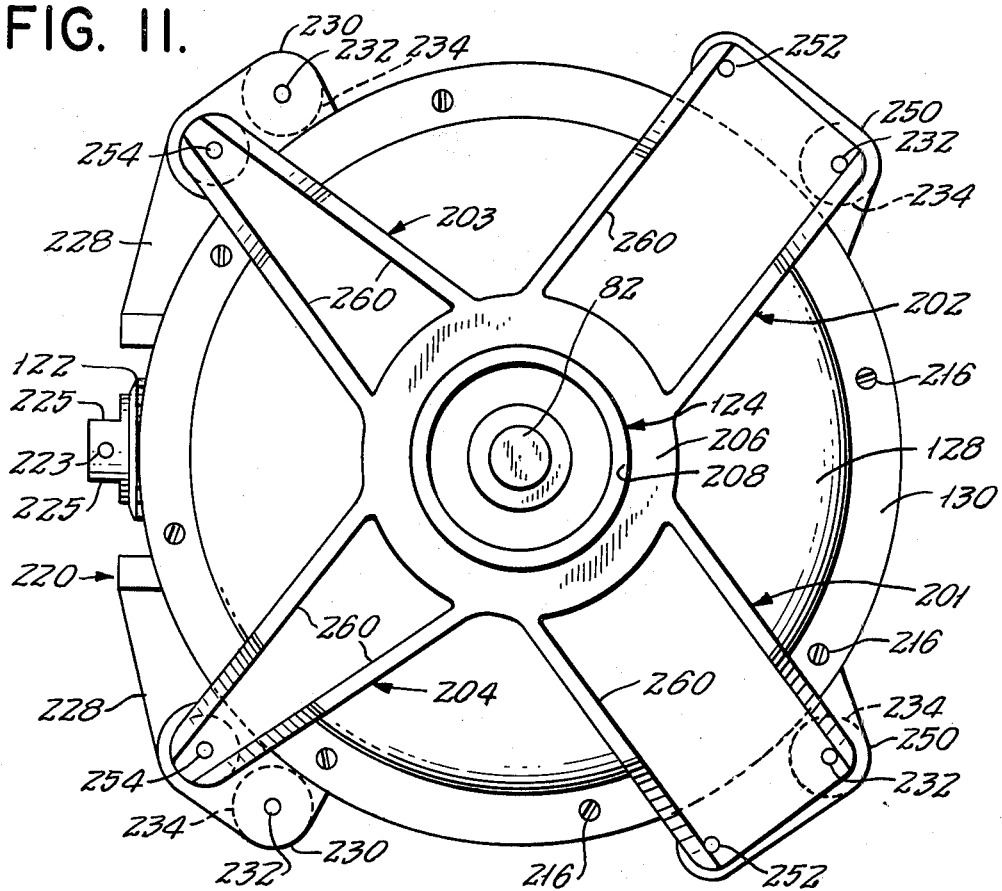
FIG. 11 is a top plan view of the drive unit and motor mount as seen looking down along the line 11—11 in FIG. 9, with the brake assembly and housing removed.
Figure 12:
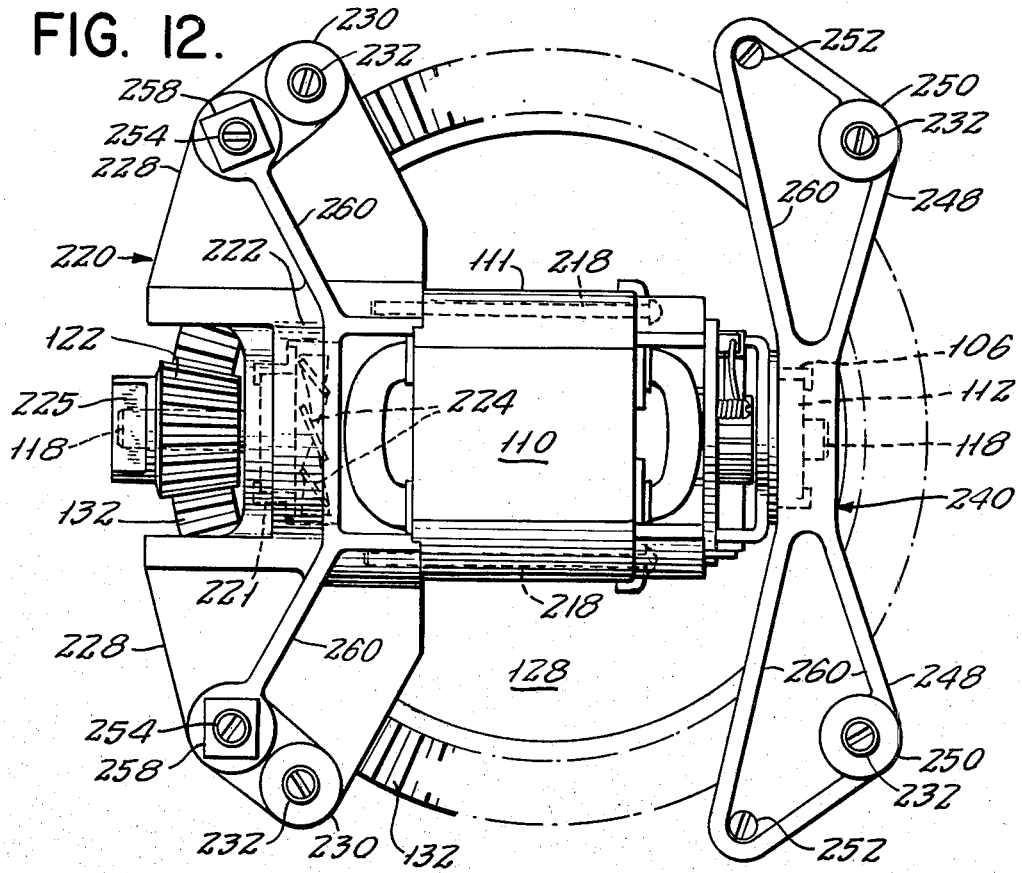
FIG. 12 is a bottom plan view of the drive unit and motor mount as shown in FIG. 11. In other words.

The drive unit is mounted in the base housing 10A (FIGS. 9 and 10) by means of a motor mount 90A, which is also shown in FIGS. 11 and 12. The base housing 10A comprises three basic structural elements. The first of these is a box-like enclosure including spaced sidewalls 16, 18, rear wall 20 and front wall 22. The second element of the base housing 10A is a substantially rectangular base plate 26 having a vertical flange 28 positioned inside of the walls. On the bottom of the base plate 26 are four feet 30 of relatively soft, resilient material, such as rubber. These resilient feet 30 are associated with a vibration isolating mounting assembly for isolating the motor mount from the housing 10A as will be described more fully infra. The third element making up the base housing 10A is a top closure 36, which is essentially rectangular to conform to the shape of the housing, but includes the circular turret 38.

It is to be understood that ventilation openings (not shown) are provided in the base plate 26 or in one or more of the walls 16, 18, 20, 22 for cooling of the motor 110. Another way in which ventilation may be provided is to space the vertical flange 28 away from the walls 16, 18, 20, 22 in one or more places to define vertical channels adjacent to the inner surface of these walls through which air can flow. It is my present preference to provide openings in the base plate 26 and also to shape the flange 28 for defining such air flow channels to assure that the motor 110 receives adequate cooling air flow, because this motor in the drive arrangement as shown is capable of performing relatively prodigious food processing tasks in which heavy motor loads are involved. If desired, the walls 16, 18, 20 and 22 may be made integral with the top closure 36. For example, the top closure and walls of the housing 10A may be injection molded as an integral structure from suitable tough, durable, injection-moldable material such as in now commercially employed for making kitchen appliance housings.

The motor mount 90A includes rigid bridging members 201, 202, 203 and 204 (see also FIG. 12) which arch up and over the motor 110, and they unite at a center portion 206 forming a bearing mount which they support concentric with the axis of rotation of the spindle 44. In this bearing mount 206 is a socket 208 for holding the outer race of a bearing assembly 124, and the inner race of this bearing assembly holds the steel shaft 82 of the spindle 44. The lower end of this steel shaft 82 carries an enlarged head 210 having a flange 212 on which is secured the concavo-convex gear support member 128 by suitable fastening means, for example a plurality of machine screws 214. This gear support member 128 is shown formed of tough, rigid plastic material, for example such as Delrin, and it has a horizontal annular rim 130 from which depends a bevelled ring gear 132 whose teeth mesh with the pinion gear 122 and encircle the motor 110. The ring gear 132 may be secured to the rim 130 by any suitable means. Alternatively, the ring gear may be integral with the member 128. In this example, as shown in FIG. 11, the ring gear is formed of Delrin and is secured to the horizontal rim 130 by a plurality of machine screws 216 (FIG. 11). It is my preference that in commercial production the spiral bevel ring gear 132 and gear support member 128 be moulded as an integral member from rigid low-friction plastic material, for example such as Delrin.

It is seen that the bearing assembly 124 rotatably supports the spindle 44 with the axis of spindle rotation extending vertically and also supports the ring gear 132 for revolving in a horizontal plane. This ring gear 132 encircles the entire motor frame 111 in a compact assembly. The upwardly arched structure of the bridging members 201, 202, 203, 204, 206 and the inverted saucer-shaped ring gear support member 128 both are nested down around the motor in overlapping relationship with one of them nested within the other. Their nested relationship contributes to the compact configuration of the drive unit and advantageously reduces the required headroom within the base housing 10A. In this embodiment the arching bridging structure 201, 202, 203, 204, 206 is nested above the ring gear support members 128; whereas in FIGS. 1 and 2 the ring gear support member 128 is nested above the arched bridging member 96.

The universal motor 110 shown in FIGS. 9 and 10 may be similar to the motor 110 in FIGS. 1 and 2, except that the conventional end bell which normally supports the shaft bearing at the left end of the motor is removed. This universal motor 110 in FIGS. 9 and 12 has a no load speed of approximately 18,000 rpm, and the ratio of the spiral bevel ring gear 132 to the spiral bevel steel pinion gear 122 is approximately 6 to 1. Thus, the no load speed of the spindle 44 is approximately 3,000 rpm, and this spindle delivers a torque output which is approximately six times greater than the torque capability of the motor itself.

The removed end bell of the motor is replaced by a frame member 220, whose overall shape is seen most clearly in FIGS. 10 and 12. The motor frame 111 is directly fastened to this frame member 220 by a pair of machine screws 218. These screws 218 are located in the same position in the motor 110 as the screws which are usually employed for holding the left end bell in place. The shaft bearing for the left end of the motor shaft 118 in FIG. 9 is mounted in a central boss 221 (FIG. 12) of the frame member 220 and located near the pinion gear 122. This pinion gear 122 is secured to the motor shaft 118 by any suitable attachment, for example by a force fit key, or as shown by a set screw 223. The outer end of the hub of the pinion gear 122 has two flat surfaces 225 (FIG. 10) for providing driving engagement with a friction disc of the brake assembly as will be explained later.

In order to cool the motor 110, the frame member 220 includes a fan casing section 222 of generally circular cylindrical configuration surrounding a bladed fan 224 (FIG. 12). As seen in FIG. 10 there are a plurality of air discharge openings 226 in the fan casing section. These discharge openings are spaced around the motor shaft 118 and allow the fan 224 to discharge cooling air which has been drawn through the motor 110 in an axial direction between the stator and armature.

The frame member 220 also includes a pair of arms 228 extending out generally horizontally from either side of the fan casing section 222. These arms 228 each have an outer end 230 with a threaded drill hole for receiving a machine screw 232 which holds one of the resilient feet 30.

In order to isolate the motor mount 90A from the base housing 10A, there is a resilient bushing 234 positioned between the outer end 230 of each arm 228 and the base plate 26. These resilient bushings 234 are held by the screws 232 and by openings 236 in the base plate 26 and serve as vibration absorbing pedestals for supporting the motor mount 90A vibrationally isolated from the base housing 10A.

The right end of the motor 110 as shown in FIG. 9 includes a conventional end ball structure for supporting the electrical brush assemblies 238 for the commutator and also for supporting a boss 112 which holds the shaft bearing for the right end of the motor shaft 118. This boss 112 is mounted in a resilient grommet 106 seated in a socket portion 239 of a front frame member 240, whose overall configuration can be seen most clearly in FIG. 12.

This frame member 240 includes a pair of arms 248 extending out generally horizontally from either side of the socket portion 239. Each arm has an outer end 250 with a threaded drill hole for receiving a machine screw 232 which holds one of the vibration-isolating resilient pedestal bushings 234 and also holds one of the resilient feet 30 in a manner similar to screw 232 shown at the right in FIG. 10.

The arched bridging members 201 and 202 (FIG. 11) are firmly secured to the outer ends 250 of the arms 248 of the front frame member 240 by the screws 232 and by an additional pair of screws 252 (FIGS. 11 and 12). Similarly, the rear arched bridging members 203 and 204 are firmly secured to the outer ends 230 of the arms 228 of the rear frame member 220 by a pair of machine screws 254. The outer ends of these bridging members 203 and 204 include depending leg portions 256 (FIG. 10) containing threaded drill holes for receiving the attachment screws 254.

In order to adjust the engagement of the teeth of the pinion gear 122 with the teeth of the ring gear 132 there is a hollow adjustment screw 258 (FIG. 10) which concentrically surrounds each attachment screw 254 and is threaded through the outer end 230 of the arm 228 of the rear frame member 220. The lower end of the adjustment screw 258 has a square head as seen in FIG. 12, and its upper end abuts up against the bottom of the depending leg 256. Thus, in effect, the adjustment screws 258 act like jacks for raising or lowering the two legs 256 of the respective bridging members 203 and 204 for raising or lowering the ring gear where it engages the pinion gear. When the inner screws 254 are tightened, they lock the adjustment screws in place.

Although two such adjustment screws 258 are shown, it is to be understood that only one such screw may be employed. For example, washers can be inserted between one of the legs 256 and the frame member 220 for achieving a coarse adjustment of the gear engagement, and then the adjustment screw serves to make a fine adjustment by acting against the other leg 256.

As illustrated, the bridging members 201, 202, 203, 204 and the frame members 220 and 240 each include various stiffening ribs 260 for providing the desired overall stiffness for the motor mount 90A.

As shown in FIG. 9, further vibration isolation is provided by a large mounting ring 262 of soft resilient material such as sponge rubber which seats down around an annular shoulder 264 on the central portion 206 of the bridging members 201, 202, 203 and 204 and which seats up within an annular shoulder 266 in the turret 38 of the top closure 36. This mounting ring 262 serves to hold the motor mount 90A accurately centered and spaced with respect to the turret 38.

The brake assembly 270 (FIG. 9 and also FIGS. 13-16) is mounted to the rear frame member 220 by screws 271 and is located adjacent to the pinion gear 122 at the rear of the motor. A friction disc 272 mates with the flats 225 on the hub of the pinion gear so that this disc 272 is rotated whenever the motor is running.

Figure 16:
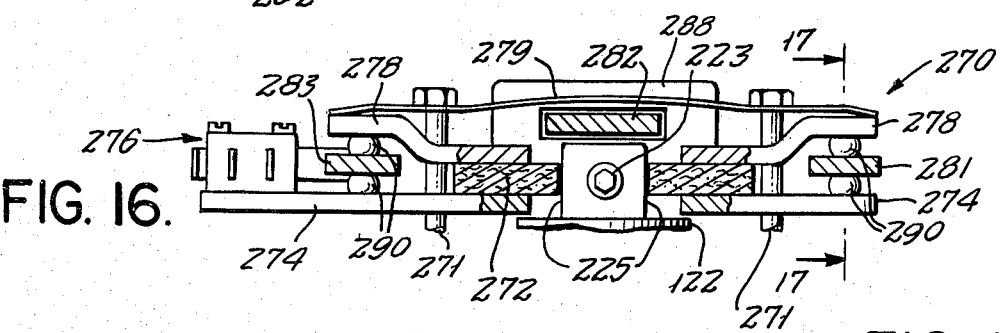
FIG. 16 is a sectional view of the brake assembly taken along the line 16—16 in FIG. 13 looking down, and showing the brake applied (engaged)

The brake assembly 270 includes a first plate 274 which forms a frame for the brake assembly and also supports a motor energizing switch 276. A second plate 278 is movably mounted on the screws 271. It can move toward and away from the first plate 274. When the brake 270 is applied, as shown in FIG. 16, the friction disc 272 is clamped between the first and second plates 274, 278. This disc 272 is formed of stiff fibrous material, and offers a high coefficient of friction. Thus, when the plates 274, 278 clamp against the disc, the motor 110 is brought to a stop immediately. A leaf spring 279 is held by the screws 271, and the ends of this leaf spring urge the second plate 278 toward the first plate 274 for clamping against the brake disc 272.

Figure 13:
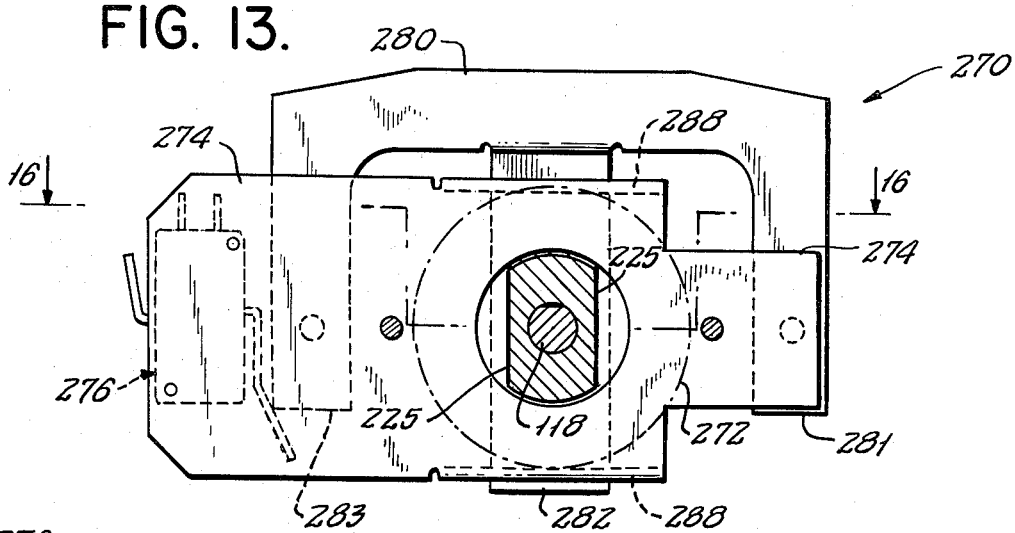
FIG. 13 is an enlarged elevational view of the brake assembly taken along the line 13—13 in FIG. 9 looking toward the left and showing the hub portion of the pinion gear in section.
Figure 14:
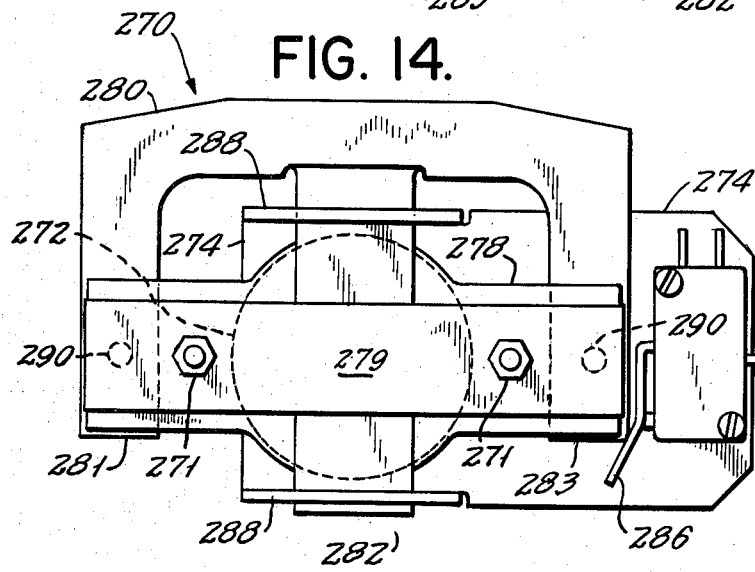
FIG. 14 shows the opposite side of the brake assembly from FIG. 13, including the motor switch. In other words.

In order to release the brake plates 274 and 278 from the disc 272, there is a generally E-shaped actuator plate 280 having three leg portions 281, 282 and 283. This actuator plate 280 is movable vertically, and it resides in its upper position as shown in FIGS. 9, 13 and 14 when the brake is applied. When the bowl 12 is mounted on the turret 38 with its cover in position and the food processor is ready for operation, then the push rod 62 (FIG. 9) is depressed through the opening 66 deflecting the stretchable diaphragm 152 and depressing the actuator plate 280 as shown by the arrow 284 in FIGS. 15 and 18, thereby releasing the brake, as will be explained. As the actuator leg portion 283 moves down, it deflects a switch arm 286 (FIG. 15), thereby closing the switch 276 for energizing the motor 110.

The center leg portion 282 of the actuator plate serves as a guide for it extends vertically in sliding relation through slots in two vertically spaced horizontal tabs 288 which are bent over from the top and bottom edges of the first plate 274.

Figure 17:
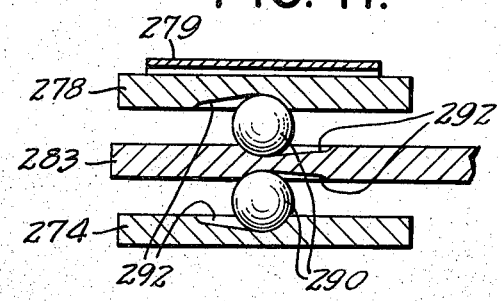
FIG. 17 is an enlarged sectional view taken along the line 17—17 in FIG. 16 showing a pair of the brake-actuating balls and associated plate members, when the brake is being applied.
Figure 18:
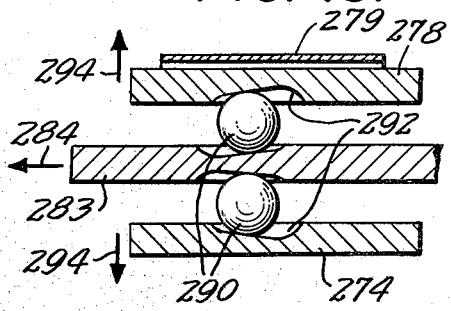
FIG. 18 shows the relative positions of these balls and plate members when the brake is released.

In order to move the first and second plates 274 and 278 away from each other to release the brake disc 272, there are four actuator balls 290 (FIG. 16) which ride in inclined grooves or tracks 292 and which are captured by the plates 274 and 278 on opposite sides of each leg portion 281 and 283. These inclined grooves 292 are formed in both sides of the leg portions 281 and 283 and in the opposed surfaces of the first and second plates 274 and 278. As shown in FIGS. 17 and 18, the inclined grooves 292 are sloped so that the balls 290 are rolled toward their shallow ends for spreading (arrows 294 in FIG. 18) the brake plates 274 and 278 further apart, when the actuator plate 280 is depressed by the push rod 62 (FIG. 9).

Figure 15:
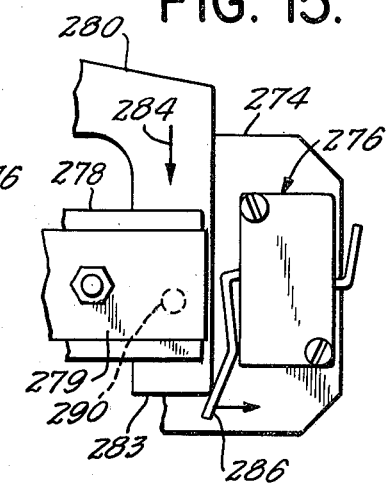
FIG. 15 illustrates the motor switch and associated components of the brake assembly when the brake has been released and the switch is turned ON for energizing the motor.

Accordingly, when the food processor is ready for operation, the actuator plate 280 is moved downwardly for releasing the brake disc 272 as illustrated in FIG. 18 and for closing the switch 276 as shown in FIG. 15. Conversely, when the bowl cover is removed, or the food processor is otherwise rendered unready for operation, the actuator plate 280 is allowed to move up to its normal position, thereby applying the brake and opening the switch 276 for deenergizing the motor 110.

It is believed that the many advantages of this invention will now be apparent to those skilled in the art. By means of this invention, it has become possible to employ an inexpensive AC/DC universal motor in a food processor. At the same time, the drive unit, including the motor, has been made extremely compact while still obtaining a very highly desirable gear ratio between the motor and the driven tool. In addition, there has been provided an automatic brake which substantially minimizes risk of injury to the user of the apparatus. It will also be apparent to those skilled in the art that various modifications may be made in this invention without departing from its spirit and scope. Accordingly, the foregoing description is to be construed as illustrative only, rather than limiting. This invention is limited only by the scope of the following claims.

I claim:

1. In a food processor of the type including a base housing enclosing a drive unit, a rotatable spindle driven by said drive unit and extending vertically upward from said housing, a bowl detachably mounted on said housing and defining a base opening receiving said spindle, a rotary tool mounted on said spindle within said bowl, and a cover detachably secured to said bowl defining a food receiving aperture therethrough, the improvement wherein said drive unit comprises:
   means for supporting an electric motor within said housing;
   a universal electric motor carried by said supporting means and having a substantially horizontal drive shaft extending from one end thereof;
   a pinion gear mounted on said drive shaft for rotation therewith;
   a ring gear engaging said pinion gear and encircling said motor for rotation thereabout in a substantially horizontal plane about a substantially vertical axis;
   means for coupling the rotation of said ring gear to said vertically extending rotatable spindle; and,
   means for controlling rotation of said motor.

2. The improvement of claim 1 wherein said coupling means comprises: a substantially circular concavo-convex support member including a central hub portion and an outer rim portion, said ring gear carried by said outer rim portion; the concave side of said support member partially enclosing said motor; and means connecting said spindle to said central hub portion for concentric rotation therewith.

3. The improvement of claim 1 wherein said motor support means comprises: first and second spaced cross members mounted in said housing for connection to the respective ends of said motor; a bridging member interconnecting said first and second cross members and overlying a motor suspended therebetween; and means carried by said bridging member for rotationally supporting said ring gear.

4. The improvement of claim 3 wherein said rotational support means comprises: a stub shaft on said bridging member; a substantially circular concavo-convex member including a central hub and an outer rim portion carrying said ring gear; and a bearing assembly supporting said central hub on said stub shaft.

5. The improvement of claim 4 wherein said rotational coupling means comprises means for connecting said spindle to said central hub for concentric rotation therewith.

6. The improvement of claim 5 wherein the concave side of said concavo-convex member partially encloses said motor.

7. The improvement of claim 1 wherein said bowl includes actuator means advanceable into said base housing and said motor rotation control means comprises: a motor control switch actuatable by said actuator means; and a drive unit brake substantially simultaneously actuatable by said actuator means.

8. The improvement of claim 7 wherein said brake comprises: a brake lever normally maintained in a first, brake engaging, position but depressible by said actuator means to a second, brake releasing, position; a brake drum mounted on said motor shaft; and a flexible brake band having a first end fixedly secured to said base housing, a body portion encircling said brake drum, and a second end engageable with said brake lever.

9. The improvement of claim 8 wherein said brake lever includes a pivoted first end and a vertically movable second end having mounted thereon a brake band engaging clamp.

10. The improvement of claim 9 wherein said clamp comprises a pair of opposed clamp members disposed on opposite sides of the second end of said brake band and normally out of engagement therewith; and fixed camming means in said base housing for urging said clamp members into clamping arrangement with said brake band upon movement of said brake lever toward its first position.

11. The improvement of claim 10 wherein said opposite sides of the second end of said brake band are serrated.

12. In a rotary food processor of the type including a base housing enclosing a drive unit, a rotatable spindle driven by said drive unit and extending vertically upward from said base housing and in which a working bowl can be detachably mounted on said base housing for holding food material to be processed in said bowl with a removable cover for covering the bowl, said bowl having a bottom with an opening therein through which said spindle extends upwardly into said bowl when said bowl is mounted on said base housing for receiving a rotatable tool onto said spindle, a drive unit comprising:
a universal electric motor having a motor frame and being positioned within said base housing below said rotatable spindle,
mounting means for mounting said universal electric motor with the axis of rotation of said motor extending horizontally and with the motor shaft extending horizontally from one end of the motor frame,
a pinion gear secured to said motor shaft for rotation by said shaft,
a ring gear engaging said pinion gear for being driven by said pinion gear,
said ring gear having a relatively large diameter and encircling the frame of said universal motor for revolving about the motor frame in a horizontal plane, and
coupling means for coupling the revolving ring gear to said spindle for rotating the spindle about a vertical axis.

13. The drive unit as claimed in claim 12, in which:
said mounting means includes a bridging member which arches up over the motor frame in nested relationship therewith and said bridging member supports bearing means positioned above the motor for revolvably supporting said coupling means.

14. The drive unit as claimed in claim 13, in which:
said coupling means for coupling the revolving ring gear to said spindle includes an inverted saucer-shaped gear support member which nests down about said arched bridging member which is turn is nested down about the motor frame for providing a compact configuration for said drive unit.

15. The drive unit as claimed in claim 12, in which:
braking means are positioned in said base housing for automatically applying a braking force to said coupling means whenever the cover is removed from its normal position on said working bowl.

16. The drive unit as claimed in claim 15, in which:
said braking force is applied to said coupling means through said pinion gear acting on said ring gear by applying the braking force to said motor shaft.

17. The drive unit as claimed in claim 16, in which:
a brake drum is secured to said motor shaft for rotation therewith, and said braking means includes a braking element frictionally engaging said brake drum for applying the braking force to said drum.

18. The drive unit as claimed in claim 17, in which:
said braking element is a flexible band passing around said brake drum for engaging said drum in wrapping relationship for rapidly stopping the rotation of said coupling means whenever the cover is removed from its normal position on said bowl.

19. The drive unit as claimed in claim 12, in which:
said motor frame is mounted to said mounting means by three resilient elements, one of said resilient elements being concentric with the motor shaft at one end of the motor frame, and the other two being symmetrically positioned at the other end of the motor frame on opposite sides of the motor shaft.

20. In a rotary food processor of the type including a base housing enclosing a drive unit, a rotatable spindle driven by said drive unit and extending vertically upward from said base housing and in which a working bowl can be detachably mounted on said base housing for holding food material to be processed in said bowl, said bowl having a bottom with an opening therein through which said spindle extends upwardly into said bowl when said bowl is mounted on said base housing for receiving a rotatable tool onto said spindle, a removable cover engageable with the bowl in a working position on the bowl for covering the bowl while the food material is being processed therein, a drive unit comprising:
a universal electric motor having a motor frame and being mounted within said base housing below said rotatable spindle with the motor shaft extending from one end of the motor frame,
a pinion gear secured to said motor shaft for rotation by said shaft,
a ring gear engaging said pinion gear for being driven by said pinion gear,
said ring gear having a relatively large diameter at least several times the diameter of said pinion gear and revolving in a horizontal plane,
a rotatable gear support having a relatively large diameter perimeter secured to said ring gear and being coupled to said spindle for coupling the revolving ring gear to said spindle, and
braking means positioned within said base housing and responsive to removal of the cover from its working position on the bowl for applying braking force to the perimeter of said gear support, thereby applying the braking force at a relatively large mechanical advantage with respect to the rotating spindle for rapidly stopping spindle rotation.

21. The drive unit as claimed in claim 20, in which:
a rotatable brake drum is secured to said motor shaft for rotation therewith and said braking means has a friction braking element frictionally engageable with said brake drum whenever the cover is removed from its working position, whereby the braking force is applied to the perimeter of said gear support through said pinion gear acting upon said ring gear.

22. The drive unit as claimed in claim 21, in which:

said braking element is a brake band extending around said brake drum for applying a powerful braking effect to the motor shaft for quickly stopping rotation of the motor, and means engageable with said brake band for compensating for wear of the brake band.

23. The drive unit as claimed in claim 13, in which:
said coupling means for coupling the revolving ring gear to said spindle includes an inverted saucer-shaped gear support member which nests down about the motor frame, and said arched bridging member in turn is nested down about the inverted saucer-shaped gear support member for providing a compact configuration for said drive unit.

24. In a food processor of the type including a base housing adapted to have a food processing bowl mounted thereon in a predetermined position and in which there is a drive unit in the base housing for driving a rotatable tool spindle in the bowl to rotate the spindle about a vertical axis, a drive unit comprising:
a universal electric motor having a motor frame and being mounted within said base housing with the motor shaft extending from one end of the motor frame,
a pinion gear secured to said motor shaft for rotation by said shaft,
a ring gear engaging said pinion gear for being driven by said pinion gear,
said ring gear having a relatively large diameter at least several times the diameter of said pinion gear and revolving in a horizontal plane encircling said motor frame,
said ring gear including a rotatable gear support which is rotatable about a vertical axis and has a saucer-shape nesting about the motor frame,
bearing means in said base housing mounting said rotatable gear support for rotation about said vertical axis, and
means for coupling said rotatable gear support to a spindle in a bowl mounted on said base housing in said predetermined position for rotating the spindle about a vertical axis in the bowl.

25. In a food processor of such type, a drive unit as claimed in claim 24, in which:
said ring gear has a diameter approximately six times the diameter of said pinion gear.

26. In a food processor of such type with a cover mountable on the bowl in operating position during running of the motor, a drive unit as claimed in claim 24 or 25, in which:
braking means are coupled to the motor shaft for braking rotation of the motor whenever the cover is removed from its operating position on the bowl.

27. In a food processor of such type, a drive unit as claimed in claim 26, in which:
said braking means include a rotatable friction disc driven by the motor shaft for rotation therewith,
first and second brake plates positioned near opposite sides of said friction disc,
spring means urge said first and second plates toward each other for frictionally engaging said plates against opposite sides of said rotatable disc for braking rotation of the motor, and
wedging means responsive to the positioning of the cover on said bowl in proper operating position and acting against said spring means for moving said first and second plates apart for releasing the brake.

28. In a food processor of such type, a drive unit as claimed in claim 27, in which:
said wedging means includes a third plate vertically movable with respect to said first and second plates,
said third plate extending between said first and second plates,
a plurality of balls captured between said third plate and each of said first and second plates, and
inclined tracks in the respective plates engaging said balls for moving said first and second plates apart when said third plate is shifted vertically in response to the proper positioning of the cover on the bowl.

29. In a food processor of such type, a drive unit as claimed in claim 24 or 25, in which:
mounting means interconnects the motor frame and said bearing means, said mounting means including
a first member secured to the motor frame and extending out beyond both sides of the motor frame,
a bridging member secured to the outer extremities of said first member and bridging up over said motor frame for holding said bearing means mounted to provide said vertical axis of rotation, and
resilient vibration-damping means interposed between said mounting means and said base housing.

30. In a food processor of such type, a drive unit as claimed in claim 29, in which:
said mounting means includes means for adjusting the engagement of said pinion gear with said ring gear.

31. In a food processor of such type, a drive unit as claimed in claim 30, in which:
said adjusting means includes at least one adjusting screw for adjusting the position of said bridging member with respect to said first member.

32. In a food processor of the type including a base adapted to have a food processing bowl held thereon, a drive assembly in the base for driving a rotatable tool mount in the bowl to rotate the tool mount about an axis, said drive assembly comprising:
a universal electric motor having a motor frame,
said motor being mounted within said base with a motor shaft extending from one end of the motor frame,
a pinion gear secured to said motor shaft for rotation by said shaft,
a ring gear engaging said pinion gear for being driven by said pinion gear,
said ring gear having a relatively large diameter at least several times the diameter of said pinion gear and revolving in encircling relationship with respect to said motor frame,
said ring gear including a rotatable gear support which is rotatable about said axis,
said rotatable gear support being in nesting relationship with respect to the motor frame,
bearing means in said base for mounting said rotatable gear support for rotation about said axis, and
means for coupling said rotatable gear support to a rotatable tool mount in a bowl held on said base in said predetermined position for rotating the tool mount about said axis in the bowl,
thereby providing a compact overall assembly configuration with low headroom requirements within said base.

33. In a food processor, a drive assembly as claimed in claim 32, in which:

said bearing mounting means extends up over said motor frame for holding said bearing means.

34. In a food processor, a drive assembly as claimed in claim 33, in which:
said rotatable gear support has an inverted saucer shape,
said rotatable gear support being positioned above said bearing mounting means, and
said rotatable gear support being in nesting relationship with respect to both said motor frame and said bearing mounting means.

35. In a food processor, a drive assembly as claimed in claim 33, in which:
said rotatable gear support has an inverted saucer shape,
said rotatable gear support being positioned between said bearing mounting means and said motor frame.

36. In a food processor, a drive assembly as claimed in claim 33, 34 or 35, in which:
first and second spaced frame members in said base hold said motor, and
said bearing mounting means extend between said first and second spaced members.

37. In a food processor, a drive assembly as claimed in claim 32, in which:
first and second spaced frame members in said base hold said motor,
said bearing mounting means extend between the mid-points of said first and second spaced frame members,
said bearing mounting means extend generally in the same direction as the shaft of said motor and extend up over the motor frame for holding said bearing means, and
said rotatable gear support is positioned above said bearing mounting means and is in nesting relationship with respect to both said motor frame and said bearing mounting means.

38. In a food processor, a drive assembly as claimed in claim 32, in which:
first and second spaced frame members in said base hold said motor,
said bearing mounting means extend between the ends of said first and second spaced frame members and arch up over said rotatable gear support.

39. In a food processor, a drive assembly as claimed in claim 36, in which:
adjusting means are provided for adjusting the position of said bearing mounting means with respect to at least one of said spaced frame members for adjusting the engagement between said pinion gear and said ring gear.

40. In a food processor of the type including a base adapted to have a food processing bowl held thereon, a drive assembly in the base for driving a rotatable tool mount in the bowl to rotate the tool mount about an axis, said drive assembly comprising:
a universal electric motor having a motor frame,
said motor being mounted within said base with a motor shaft extending from one end of the motor frame,
a pinion gear secured to said motor shaft for rotation by said shaft,
a ring gear engaging said pinion gear for being driven by said pinion gear,
said ring gear having a diameter much larger than the diameter of said pinion gear and revolving in encircling relationship with respect to said motor frame,
said ring gear including a rotatable gear support which is rotatable about said axis,
said rotatable gear support being in nesting relationship with respect to the motor frame,
bearing means in said base for mounting said rotatable gear support for rotation about said axis, and
means for coupling said rotatable gear support to a rotatable tool mount in a bowl held on said base in said predetermined position for rotating the tool mount about said axis in the bowl,
thereby providing a compact overall drive assembly with low headroom requirements within said base.

41. A drive assembly in a food processor of the type including a base adapted to have a food processing bowl held thereon, said bowl being adapted to be closed by a cover in predetermined position on the bowl during operation of said drive assembly, said drive assembly driving a rotatable tool mount in the bowl to rotate the tool mount about an axis, said drive assembly comprising:
a universal electric motor having a motor frame,
said motor being mounted within said base with a motor shaft extending from one end of the motor frame,
a pinion gear secured to said motor shaft for rotation by said shaft,
a ring gear engaging said pinion gear for being driven by said pinion gear,
said ring gear having a relatively large diameter at least several times the diameter of said pinion gear and revolving in encircling relationship with respect to said motor frame,
said ring gear including a rotatable gear support which is rotatable about said axis,
said rotatable gear support being in nesting relationship with respect to the motor frame,
bearing means in said base for mounting said rotatable gear support for rotation about said axis,
means for coupling said rotatable gear support to a rotatable tool mount in a bowl held on said base in said predetermined position for rotating the tool mount about said axis in the bowl, and
braking means positioned within said base and responsive to removal of the cover from said predetermined position on the bowl for applying braking force effectively to the perimeter of said gear support,
thereby applying the braking force at a relatively large radius with respect to the tool mount axis for rapidly stopping rotation of said tool mount.

42. A drive assembly as claimed in claim 41, in which:
said braking force is applied to a member secured to said motor shaft, and
the braking force is thereby applied to the perimeter of said gear support by said pinion gear transferring the resultant braking force to said ring gear.

* * * * *